A. ADAMS.
BOLT.
No. 11,606. Reissued June 8, 1897.
Fig. 1.
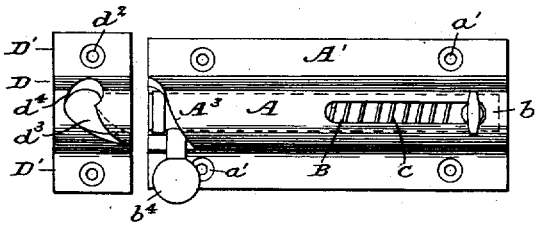
Fig. 2.
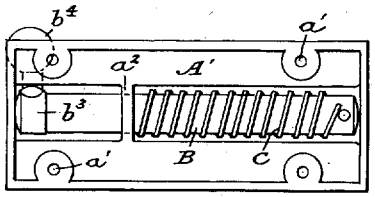
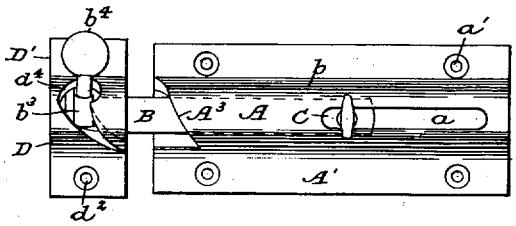
Fig. 3.
Fig. 6.
Fig. 4.
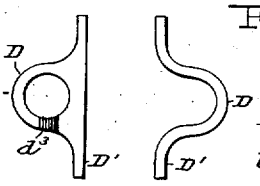
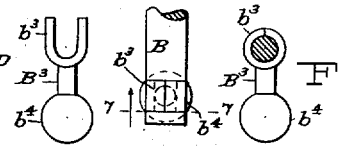
Fig. 8.
Fig. 5. Fig. 7.
Witnesses:
E. R. Bolton
H. N. Jenkins
Inventor:
Austin Adams
By J. O. Fowler Jr
his Attorney.

UNITED STATES PATENT OFFICE.

AUSTIN ADAMS, OF NEW YORK, N. Y.

BOLT.

SPECIFICATION forming part of Reissued Letters Patent No. 11,606, dated June 8, 1897.

Original No. 520,227, dated May 22, 1894. Application for reissue filed June 12, 1896. Serial No. 595,370.

*To all whom it may concern:*

Be it known that I, AUSTIN ADAMS, a citizen of the United States, and a resident of New York, in the county and State of New York, have invented a certain new and useful Fastening Device, of which the following is a specification.

My invention relates to self-locking appliances, and in particular to a fastening device primarily adapted for doors, swinging windows, or like articles; and it has for its object the provision of an appliance simple and inexpensive in construction, readily applied and operated, and efficient in practical use.

To attain the desired end, my invention consists in the construction and arrangement of parts first described, and then pointed out in the claims.

In the drawings which form a part of this specification, Figures 1 and 3 represent front elevations of my fastener; Fig. 2, a rear view of the same. Figs. 4 and 5 are edge views of my keepers, and Figs. 6, 7, and 8 are detail views of my weighted lever.

Like letters of reference indicate like parts in all the views.

While, as before stated, my invention is applicable to a great variety of articles, I will first consider it as applied to socket-bolts for doors, &c.

Referring again to the drawings, A represents a barrel ordinarily equipped with lateral flanges or base-wings A′, pierced or formed with openings $a'$ for screws or like securing devices, whereby the barrel A may be secured to its seat upon any article that may be required to be fastened thereby.

Within the barrel A slides the reciprocating bolt-bar B, which is provided with a suitable manual operating device, as the stud $b$, ordinarily terminating in a knob, which stud $b$ works in a longitudinal slot $a$, formed in the barrel A. I also prefer to use with my bolt-bar B a retractile device, as the spiral spring C, located on said bolt-bar and lying between the stud $b$ and the partition $a^2$ of the barrel A, the resilience of the said spring C serving to normally hold the bolt-bar B in an open or unlocked relation. The bolt-bar B is provided with an annular groove, milled or otherwise formed in the same near the extremity thereof, in which works a collar formed by closing together to a meeting-point the bifurcated extremity $b^3$ of the lever $B^3$, at the other free end of which lever is located the ball $b^4$. The end of my bolt-barrel A is provided with an incline or angular recess $A^3$, which receives the weighted lever $B^3$, the said lever following the incline $A^3$ down to its seat when the bolt-bar B is in an unlocked or normal open position. By means of this construction the weighted lever on the end of my bolt-bar is held flush with the edge of the door, &c., and thereby prevents the same from becoming caught or entangled in the garments of a person passing by, and I am also able to shoot the bolt a much farther distance than would be the case if the bolt were set back on the door, &c., to obviate the trouble caused by the said projecting lever $B^3$.

I ordinarily use in connection with the bolt-bar B a staple or strap, as D, located adjacent to the barrel A and provided with a base-plate D′ and screw-holes $d^2$, and constructed and arranged to engage the outer end of the bolt-bar B upon the same being closed or locked. This keeper D is provided with a hollow or open interior portion and is preferably constructed in tubular form. The exterior face of my keeper is provided with an inclined edge ordinarily formed by cutting a spiral groove $d^3$ in the said face, which said groove terminates in a holding recess or cavity $d^4$. The said keeper may be constructed in the form of a strap, as shown in Fig. 5, or may be provided with a bottom plate extending entirely under the same, as shown in Fig. 4.

In operation, in order to close or lock the parts, the bolt-bar B is pushed forward by means of the finger-stud $b$, whereupon the lever $B^3$ on end of the bolt-bar will follow the incline of the spiral groove $d^3$ and enter the recess $d^4$ at the extremity of the same, the said recess extending backward as regards the motion of the bolt described, and the resilience of the spring C serving to draw the lever into the said cavity and thus hold the bolt-bar B in a locked relation. To unfasten or release the said bolt-bar, it is only necessary to turn back the weighted lever until it enters the groove $d^3$, whereupon the retracted spring C causes it to follow the incline of the groove, and by reason of the incline $A^3$, formed in the end of the bolt-barrel, it is caused to enter the recess formed thereby and to flush itself completely with the end of the bolt-barrel.

My bolt is shown for use with left-hand doors, but it may be adapted for use with right-hand doors by simply inverting or turning around the two members of my fastener.

My invention is peculiarly adapted to securely bolt folding and sliding doors which cannot be secured by means of the ordinary bolts.

It is obvious that any one skilled in the art to which my invention relates may apply my fastener to a great number of movable articles other than doors or box-lids that require to be secured in a closed relation.

As it is evident that many changes in the construction and relative arrangement of parts may be resorted to without departing from the spirit and scope of my invention, I would have it understood that I do not restrict myself to the particular construction and arrangement of parts shown and described, but that I reserve the right to make such changes, and that

What I claim as new, and desire to secure by Letters Patent, is—

1. In a fastening device, the combination, with a bolt-barrel provided at its extremity with an inclined recess, of a spring, and a spring-reacted bolt-bar working therein, and provided at its extremity with a weighted lever constructed and arranged to travel along the edge of the extremity of said incline when retracted by the spring, thereby automatically flushing itself with the said bolt-barrel.

2. In a fastening device, the combination, with a bolt-barrel and with a spring-reacted bolt-bar working therein, and provided at its extremity with a weighted lever, of a keeper consisting of a plate provided with a hollow interior portion provided with an inclined edge formed by cutting a spiral groove in the face of the same.

3. In a fastening device, the combination, with a bolt-barrel and with a spring-reacted bolt-bar working therein, and provided at its extremity with a weighted lever, of a keeper consisting of a plate provided with a hollow interior portion and with an inclined edge formed by cutting a spiral groove in the face of the same, and with a holding-recess located adjacent to the said groove.

4. In a fastening device, the combination, with a spring bolt-bar consisting of one integral piece and provided with an annular groove formed therein near the end of the same, of a weighted lever movably mounted thereon and provided with a bifurcated extremity constructed and arranged to be closed to a meeting-point within the said groove, whereby the solid head thus formed receives the force or blow of the spring-reacted bolt.

5. In a fastening device, the combination, with one member constituting a keeper for the latch provided with a spiral bearing or slot cut through the exterior wall thereof and terminating in a locking-recess, of another member constituting a latching device and consisting of a rotatable member constructed and arranged when engaged with the first member to follow the groove sufficiently far to become locked therein.

6. In a fastening device, the combination, with one member consisting of a pivoted or swinging latch, of another member consisting of a keeper provided with a spiral slot or way cut through the wall thereof, the rear edges of which incline upwardly and rearwardly against which the latch works, and also provided with a locking-recess extending downwardly and rearwardly, substantially as specified.

In testimony of the foregoing specification I do hereby sign the same, in the city of New York, county and State of New York, this 19th day of May, A. D. 1896.

AUSTIN ADAMS.

Witnesses:
H. N. JENKINS,
G. DITTMAR.